United States Patent
Bycroft

[15] 3,643,610
[45] Feb. 22, 1972

[54] INCINERATOR

[72] Inventor: William R. Bycroft, P.O. Box 126, Williamsfield, Ill. 61489

[22] Filed: July 15, 1960

[21] Appl. No.: 55,009

[52] U.S. Cl. ............................................. 110/8 C, 110/18 C
[51] Int. Cl. ............................................................. F23g 5/12
[58] Field of Search .............................. 110/8, 8 C, 18, 18 C

[56] References Cited

UNITED STATES PATENTS

| | | | |
|---|---|---|---|
| 1,769,879 | 7/1930 | Howle | 110/18 C |
| 3,001,487 | 9/1961 | Meyer | 110/8 C |
| 2,887,074 | 5/1959 | Friedberg | 110/8 C |
| 3,076,421 | 2/1963 | Spitz | 110/18 C |
| 2,748,728 | 6/1956 | Triggs | 110/18 C |
| 1,758,487 | 5/1930 | Warren | 110/18 |
| 2,993,454 | 7/1961 | Hebert | 110/8 |

Primary Examiner—Kenneth W. Sprague
Attorney—Hill, Sherman, Meroni, Gross & Simpson

[57] ABSTRACT

An incinerator includes a cabinet having a concave hopper that is apertured with draft openings, and a burner supplied by fluid fuel which directs a blast of flame inwardly through the cabinet against the material to be incinerated that is supported on the hopper. Door means expose substantially the entire upper side of the hopper, and within the cabinet there is provided a guard at the burner opening to prevent suffocation of the flame.

23 Claims, 4 Drawing Figures

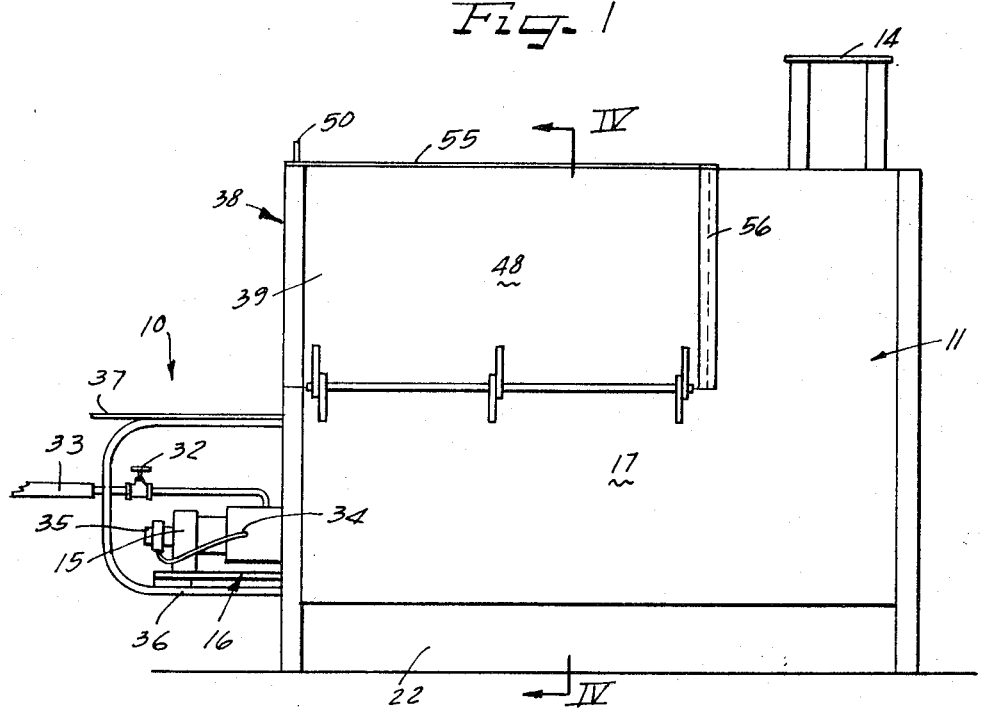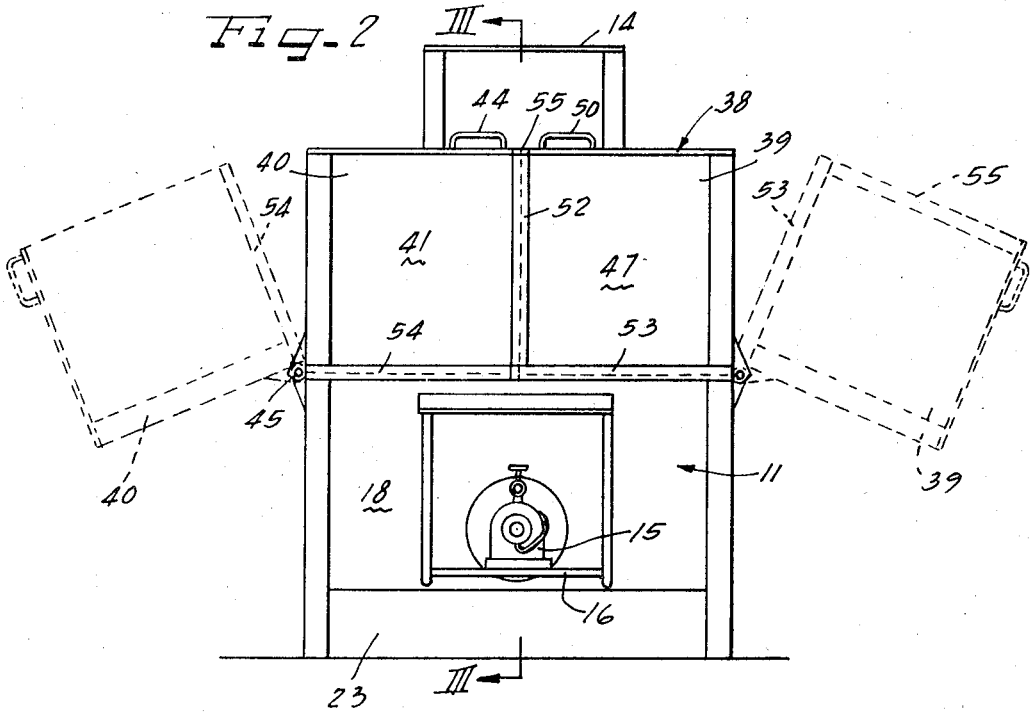

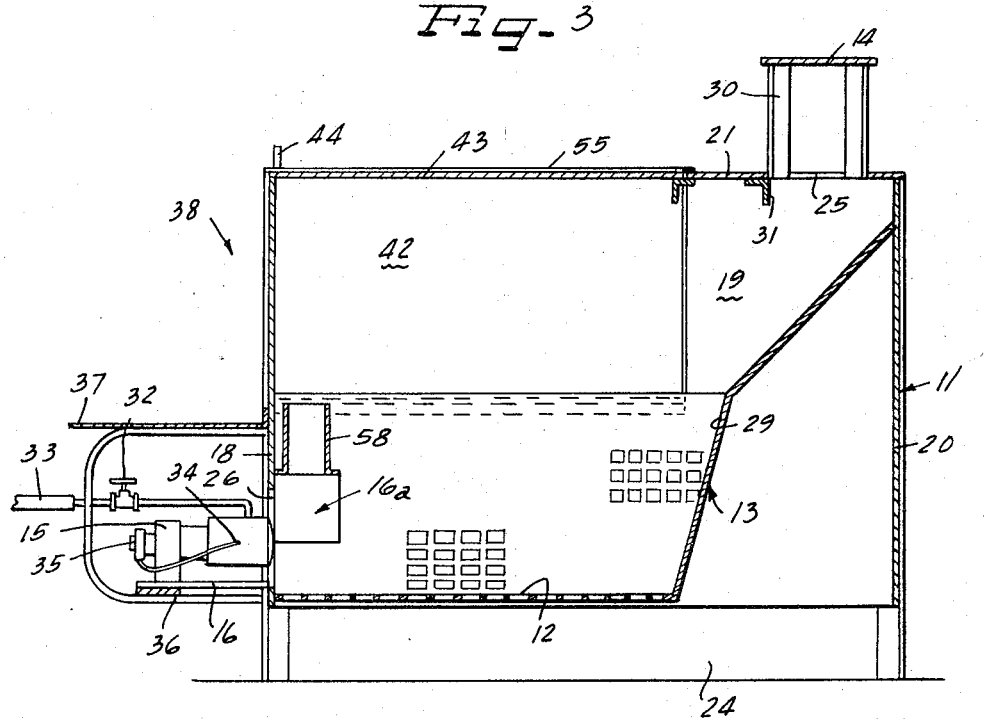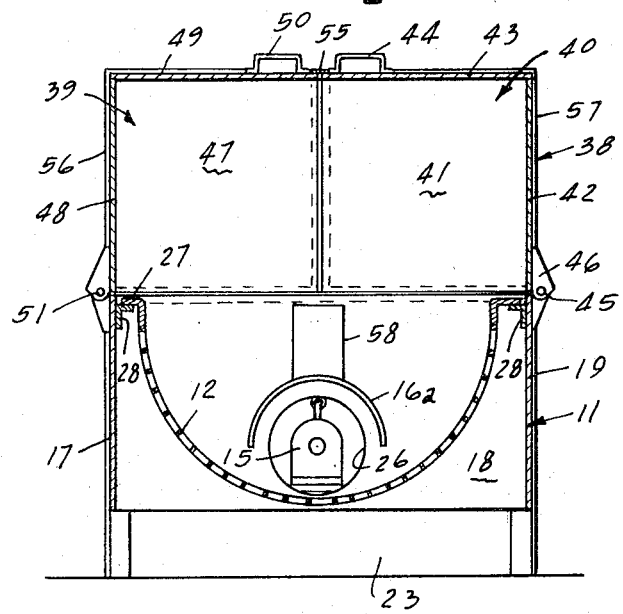

INCINERATOR

BACKGROUND OF THE INVENTION

1. Field of the Invention

This invention relates to incinerators, and more specifically to one that is operated by fluid fuel such as butane gas, and which includes a door arrangement enabling the reception of proportionately large material to be incinerated.

2. Description of the Prior Art

Livestock such as cattle and hogs have a certain mortality rate, and when a livestock grower loses an animal by death, such death is ordinarily a consequence of illness and therefore the carcass is unusable and must be destroyed. Burial is unsatisfactory since there is a possibility that organisms that caused the death could survive and in some manner escape interment. Accordingly, it has long been the practice of livestock growers to destroy the carcasses of deceased animals by fire. In the past, special equipment has not been utilized, and instead a bonfire has been created of logs or other wood and onto which the carcass has been thrown for destruction by combustion. This method is thousands of years old and is identical to that used by the devout in Old Testament times in making burnt offerings or sacrifices.

Where the carcass is large, the rate of consumption by fire is slow, and the fire has required periodic attendance or stoking to insure destruction of the entire carcass. Moreover, there is a possibility that not all parts of the carcass will be thoroughly destroyed, and further, such an activity causes both smoke and odor pollution. It has therefore of necessity been conducted remote from areas where people are present.

SUMMARY OF THE INVENTION

According to my invention, an incinerator is provided which is capable of handling and disposing of the carcasses of the largest domestic animals, doing so in an efficient manner. Incinerators of reduced size can be constructed in accordance with this invention for handling less bulky material that is to be incinerated. A substantially fully closed cabinet, open at the bottom, is provided with a hopper that is upwardly concave on which the material to be incinerated is disposed. A high-capacity burner, such as one operating on fluid fuel, directs a blast of flame inwardly through an opening in the cabinet above the hopper directly onto the material to be incinerated. Means are provided for obtaining easy access to the hopper for loading and for guarding the burner against damage and flame suffocation.

Accordingly, it is an object of the present invention to provide a heavy-duty incinerator.

Another object of the present invention is to provide an incinerator that is capable of destroying carcasses of large domestic animals.

Another object of the present invention is to provide an incinerator which operates so efficiently that there is no smoke or odor pollution created when animal carcasses are destroyed.

Another object of the present invention is to provide an incinerator which may be readily loaded by gravity from above.

A still further object of the present invention is to provide means for preventing suffocation of the blast of flame due to the manner in which the incinerator is loaded.

Many other advantages, features and additional objects of the present invention will become manifest to those versed in the art upon making reference to the detailed description and to the accompanying sheets of drawings in which a preferred structural embodiment incorporating the principles of the present invention is shown by way of illustrative example.

DESCRIPTION OF THE DRAWINGS

FIG. 1 is a side view of an incinerator constructed according to the principles of the present invention;

FIG. 2 is an end view thereof, the door means of which are shown in broken lines in an open position;

FIG. 3 is a cross-sectional view taken substantially along the line III—III of FIG. 2; and FIG. 4 is a cross-sectional view taken substantially along the line IV—IV of FIG. 1.

AS SHOWN ON THE DRAWINGS

The principles of the present invention are particularly useful when embodied in an incinerator such as shown in FIG. 1, generally indicated by the numeral 10. The incinerator includes a cabinet 11 which has within it a hopper 12 and a baffle 13, the cabinet 11 being surmounted by a flue cap 14. A burner 15 is secured to one end of the cabinet, being carried by support means 16, while within the cabinet there is provided antisuffocation means in the form of a guard 16a.

The cabinet 11 has four sidewalls 17–20 and a top wall 21. The walls typically comprise sheet steel one-eighth inch in thickness rigidly joined together and supported by angle iron at each of its four corners to provide supporting legs. Beneath each of the sidewalls 17–20 there is a draft opening such as 22–24, while at the upper end of the cabinet 11 there is a flue opening 25. The cabinet wall 18 has a burner opening or aperture 26, best seen in FIG. 4, which opens into the cabinet immediately above the lowest part of the hopper 12. The hopper 12 is extensively apertured to facilitate the free flow of air, and has marginal portions 27 fixed secured to a horizontal angle iron 28 joined to the inner surface of the cabinet 11. One end of the hopper 12 is closed by the wall 18 and the opposite end is closed by the baffle 13. The hopper 12 is upwardly concave so that as material is being consumed, material that remains may roll or slide downwardly to the center to be in better alignment with the hottest portion of the flame from the burner 15. To this end, the lower side of the hopper 12 communicates directly with the various draft openings 22–24, and communicates at its upper side directly with the flue opening 25.

The baffle 13 extends from the hopper 12 to the flue opening 25 and has a lower portion 29 which is directed to cause a swirling of flame and gas upwardly and back toward the burner 15 to act on the material from above.

The flue cap 14 is open at all four sides and is supported at each corner by a leg 30 of angle iron. A bar or brace 31 is disposed within the cabinet 11 at the underside of the top side 21 for stiffening the top side adjacent to the aperture 25.

The burner 15 is connected by a control valve 32 and a line 33 to a supply of fluid fuel (not shown) which typically constitutes low pressure gas such as butane. The burner is of the self-generating type and includes a thermopile 34 connected to a safety valve 35, the thermopile being in the flame to shut down the supply of fuel in the absence of ignition. The burner 15 has a typical capacity which is over 100,000 B.t.u./hr., for instance in the range between 300,000 and 500,000 B.t.u./hr. When the burner operates, it directs a blast of flame inwardly through the burner opening 26 in the cabinet above the hopper 12 and onto the material to be incinerated that is supported on the hopper 12. The support means 16 for the burner 15 is provided with a guard 36 that extends below the burner 15 and also extends about and above the burner 15, and if desired, the guard may include a horizontal steplike portion 37.

Portions of the top wall 21, the end wall 18, and the sidewalls 17 and 19 are so formed and are so rigidly joined together as to provide door means generally indicated at 38 disposed above the hopper 12. To that end, the door means 38 includes a door 39 and a door 40. The door 40 includes the upper left quarter 41 of the side 18, the upper front quarter 42 of the side 19, and the left front portion 43 of the top 21. The portions 41, 42, and 43 are rigidly joined together as by welding to provide a single unit that has a handle 44 and which is hinged about an axis 45 for movement from the position shown in FIG. 2 in solid lines to the position shown in FIG. 2 in dashed lines. At least one of the hinges 46 (FIG. 4) is provided with a portion that can abut the sidewall 19 if desired. Similarly, the door 39 includes portions 47–49 rigidly joined together and having a handle 50, for pivoting about an axis 51. The door 39 is provided with a strip 52 which overlaps the joint between the doors 39 and 40, and the doors 39 and 40 are provided with a pair of strips 53, 54 which respectively overlap the adjacent portion of the side 18. Similarly, the door 39 is provided with a strip 55 that overlaps the portion 43 of the top side of the door 40. Similarly, the doors 39 and 40 are provided with a pair of strips 56, 57 which respectively overlap the adjacent portion of the sides 17 and 19.

With the door means 38 open, the top half of the front side 18 is removed, the major front portion of the top side 21 is removed, and the major front portions of the upper half of the sides 17 and 19 are removed, thereby enabling free access which is entirely unobstructed for loading the hopper 12 from above, for instance by a front-loader type of tractor. With the hopper 12 loaded and with the door means 38 reclosed, the burner is ignited, and in a relatively short time, even a large carcass, for instance that of a 350-pound hog, is reduced to a handful of fine ash. No smoke and no odor emanates from the flue opening 25, and thus it has been possible to operate this device in relatively close proximity to other human activities. As the material is consumed, unconsumed material moves of its own weight to become adequately aligned with the blast of flame, and thus no attention needs to be paid to the load during its consumption.

In loading a carcass into the incinerator 11, care should be taken that no major portion of the carcass blocks the burner aperture 26 so as to thereby suffocate the burner 15. Accordingly, it is preferred that the guard 16a be provided in the cabinet in a manner so as to project horizontally internally above the burner opening 26. In the present embodiment, as best seen in FIG. 4, the guard 16a comprises a semicylindrical member which is concave downwardly and which is secured to the front side 18 adjacent to the burner opening 26. By this structure, the shape of the blast of flame is not adversely affected and any material resting on the top of the guard 16a will ultimately slide off due to gravity to be consumed, but more important, to be directed and/or held away from the opening 26 so as not to suffocate the burner. It is further preferable that the guard 16a be provided with an upwardly directed aperture into which there is fixedly secured an internal flue 58, the upper end of which terminates below the level of the door means 38 so as not to constitute any kind of interference with normal loading. If a carcass abuts the inner semicircular edge of the guard 16a, flame can still pass internally through the internal flue 58, and will shortly thereafter have burned through whatever material was abutting the inner edge of the guard 16a.

With a hopper 12 that is about 2 feet wide and 3 feet long, the device is capable of handling a 300-pound load and a burner having a rating of 300,000 B.t.u. is suitable. With an incinerator as shown where the hopper 12 is approximately square as viewed from above, namely about 3 feet × 3 feet, or having a rating of 500,000 B.t.u., it has taken about 2½ hours to dispose of a 700-pound load. If the load be increased to about 1,400 pounds, the consumption time is on the order of 3⅓ hours.

Although various minor modifications might be suggested by those versed in the art, it should be understood that I wish to embody within the scope of the patent warranted hereon, all such embodiments as reasonably and properly come within the scope to my contribution to the art.

I claim as my invention:

1. An incinerator, comprising:
a. a cabinet having normally closed side and top walls with a substantial draft opening below at least one of said sidewalls and a flue opening venting the upper end of said cabinet;
b. an extensively apertured hopper supported by and within said cabinet above said draft opening, the lower side of said hopper communicating with said draft opening, and the upper side of said hopper communicating with said flue opening;
c. a burner arranged to be connected to a supply of fluid fuel and to discharge a blast of flame inwardly through an opening in said cabinet just above said hopper and directly into the material to be incinerated supported on said hopper; and
d. door means, forming part of said cabinet, by which part of the top and part of three sides of said cabinet above said hopper open up free of any structural obstruction, thereby enabling direct access to the upper side of said hopper for loading the incinerator with the material to be incinerated.

2. An incinerator according to claim 1 in which said door means includes two doors, each of which forms a part of the top, part of one side and part of an adjacent side, said parts being rigidly joined together for movement as a unit.

3. An incinerator according to claim 2 in which each of said doors has a horizontal hinge respectively disposed on opposite sides of said cabinet.

4. An incinerator according to claim 1 in which said cabinet is bottomless and in which said draft opening is below all of said sidewalls and leading directly to the lower side of said hopper.

5. An incinerator according to claim 1 including an imperforate baffle from said hopper to said flue opening toward which flame from said burner is directed by said baffle.

6. An incinerator according to claim 5 in which said baffle has a lower portion directed to cause swirling of flame and gas upwardly and back toward said burner.

7. An incinerator according to claim 1 in which said hopper is upwardly concave to enable material to roll or fall toward the center into alignment with the blast of flame.

8. An incinerator according to claim 1 including a guard secured to said cabinet at said burner opening in partially encircling relation thereabove for preventing the material to be consumed from suffocating said burner, said guard being semicylindrical, with its convex surface directed upwardly.

9. An incinerator according to claim 1 including a guard secured to said cabinet at said burner opening in partially encircling relation thereabove for preventing the material to be consumed from suffocating said burner, said guard having an aperture, and an internal flue secured to said guard at said guard aperture.

10. An incinerator according to claim 9, said door means in one of said sidewalls being directly above said burner opening, said internal flue projecting upwardly no higher than the adjacent part of said door means.

11. An incinerator according to claim 1, including support means fixedly supporting said burner on said cabinet, said support means extending from below said burner to above said burner and constructed as a guard.

12. An incinerator according to claim 1, including support means fixedly supporting said burner on said cabinet, said support means extending from below said burner to above said burner and constructed as a step for supporting a person.

13. An incinerator, comprising:
a. a cabinet having normally closed side and top walls with a substantial draft opening below at least one of said sidewalls and a flue opening venting the upper end of said cabinet;
b. an extensively apertured hopper supported by and within said cabinet above said draft opening, the lower side of said hopper communicating with said draft opening, and the upper side of said hopper communicating with said flue opening;
c. a burner arranged to be connected to a supply of fluid fuel and to discharge a blast of flame inwardly through an opening in said cabinet just above said hopper and directly onto the material to be incinerated supported on said hopper; and
d. said hopper being upwardly concave to enable material to roll or fall toward the center into alignment with the blast of flame.

14. An incinerator according to claim 13 in which said cabinet is bottomless and in which said draft opening is below all of said sidewalls and leads directly to the lower side of said hopper.

15. An incinerator according to claim 13 including an imperforate baffle from said hopper to said flue opening toward which flame from said burner is directed by said baffle.

16. An incinerator according to claim 13 in which said baffle has a lower portion directed to cause swirling of flame and gas upwardly and back toward said burner.

17. An incinerator according to claim 13 including a guard secured to said cabinet at said burner opening in partially encircling relation thereabove for preventing the material to be consumed from suffocating said burner, said guard being semicylindrical, with its convex surface directed upwardly.

18. An incinerator according to claim 13 including a guard secured to said cabinet at said burner opening in partially encircling relation thereabove for preventing the material to be consumed from suffocating said burner, said guard having an aperture, and an internal flue secured to said guard at said guard aperture.

19. An incinerator according to claim 18, including door means in one of said sidewalls directly above said burner opening, said internal flue projecting upwardly no higher than the adjacent part of said door means.

20. An incinerator according to claim 13, including support means fixedly supporting said burner on said cabinet, said support means extending from below said burner to above said burner and constructed as a guard.

21. An incinerator according to claim 13, including support means fixedly supporting said burner on said cabinet, said support means extending from below said burner to above said burner and constructed as a step for supporting a person.

22. An incinerator according to claim 13 in which said hopper and said burner are sized to consume the carcass of a grown domestic farm animal in less than 4 hours.

23. An incinerator according to claim 1 in which said door means and said hopper are sized to receive and said burner is sized to consume the carcass of a grown domestic farm animal, and doing so in less than 4 hours.

* * * * *